United States Patent
Sato

(10) Patent No.: US 9,165,122 B2
(45) Date of Patent: Oct. 20, 2015

(54) CONTENT REPRODUCING DEVICE, CONTENT REPRODUCING METHOD, AND CONTENT REPRODUCING SYSTEM

(71) Applicant: KABUSHIKI KAISHA TOSHIBA, Minato-ku, Tokyo (JP)

(72) Inventor: Jun Sato, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/243,846

(22) Filed: Apr. 2, 2014

(65) Prior Publication Data

US 2014/0337626 A1 Nov. 13, 2014

Related U.S. Application Data

(63) Continuation of application No. PCT/JP2013/063186, filed on May 10, 2013.

(51) Int. Cl.
*H04L 9/32* (2006.01)
*G06F 21/10* (2013.01)
*H04L 29/06* (2006.01)

(52) U.S. Cl.
CPC ............ *G06F 21/10* (2013.01); *H04L 63/0869* (2013.01); *H04L 2463/103* (2013.01)

(58) Field of Classification Search
CPC ............................ G06F 21/10; H04L 63/0869
USPC .............................................. 713/169; 705/59
See application file for complete search history.

(56) References Cited

U.S. PATENT DOCUMENTS

| 7,299,292 B2 | 11/2007 | Morten et al. |
| 7,451,492 B2 * | 11/2008 | Iga .................................. 726/30 |
| 7,937,750 B2 * | 5/2011 | Mahalal et al. .................... 726/9 |
| 8,612,355 B2 * | 12/2013 | Lee et al. .......................... 705/59 |

(Continued)

FOREIGN PATENT DOCUMENTS

| JP | 2002-169740 A | 6/2002 |
| JP | 2003-324712 A | 11/2003 |

(Continued)

OTHER PUBLICATIONS

An English Translation of the International Search Report mailed by Japan Patent Office on Jun. 11, 2013 in the corresponding PCT application No. PCT/JP2013/063186 and Notification (PCT/IB/311)—3 pages.

(Continued)

*Primary Examiner* — Teshome Hailu
(74) *Attorney, Agent, or Firm* — Knobbe, Martens Olson & Bear LLP

(57) ABSTRACT

According to one embodiment, a content reproducing device is provided with connection unit and reproducing unit. The connection unit connects a license server and removable medium to each other in such a manner that mutual authentication can be carried out between the license server and removable medium, and rights information can be downloaded from the license server to the removable medium. The reproducing unit carries out mutual authentication between itself and the removable medium and, when the authentication is successful, acquires rights information recorded on the removable medium to thereby decrypt the encrypted content item delivered by the content server on the basis of the rights information, and subject the decrypted content item to streaming reproduction.

10 Claims, 6 Drawing Sheets

(56) References Cited

U.S. PATENT DOCUMENTS

| | | | |
|---|---|---|---|
| 8,893,307 B2 | 11/2014 | Kuno et al. | |
| 2005/0060536 A1* | 3/2005 | Iga | 713/155 |
| 2005/0120125 A1* | 6/2005 | Morten et al. | 709/231 |
| 2013/0042114 A1 | 2/2013 | Ueda et al. | |
| 2014/0075195 A1 | 3/2014 | Kobayashi et al. | |

FOREIGN PATENT DOCUMENTS

| | | |
|---|---|---|
| JP | 2006-109391 A | 4/2006 |
| JP | 2006-222496 A | 8/2006 |
| JP | 2007-195103 A | 8/2007 |
| JP | 2007-195149 A | 8/2007 |
| JP | 2007-336134 A | 12/2007 |
| JP | 2008-016095 A | 1/2008 |
| JP | 2008-177803 A | 7/2008 |
| JP | 2010-237918 A | 10/2010 |
| JP | 2010-239436 A | 10/2010 |
| JP | 2012-247961 A | 12/2012 |
| JP | 2012-248135 A | 12/2012 |
| JP | 2013-038736 A | 2/2013 |
| WO | WO 2014/181470 A1 | 11/2014 |

OTHER PUBLICATIONS

"Introducing Next generation Secure Memory Technology," pamphlet, Nov. 2012, Panasonic Corporation, Samsung Electronics Co., Ltd., Sony Corporation, Toshiba Corporation http://us.seeqvault.com/docs/NSM_White_Paper_20121116r2.pdf.

"Marlin Simple Secure Streaming (MS3)," published, 2009-2011, Intertrust Technologies Corporation http://www.marlin-community.com/files/MS3_whitepaper_v1_110517.pdf.

International Search Report issued by Japan Patent Office on Jun. 11, 2013 in the corresponding PCT Application No. PCT/JP2013/063186—9 pages.

Final Office Action mailed by Japan Patent Office on Feb. 3, 2015 in the corresponding Japanese patent application No. 2013-547752—4 pages.

First Office Action mailed by Japan Patent Office on Jun. 3, 2014 in the corresponding Japanese patent application No. 2013-547752—7 pages.

\* cited by examiner

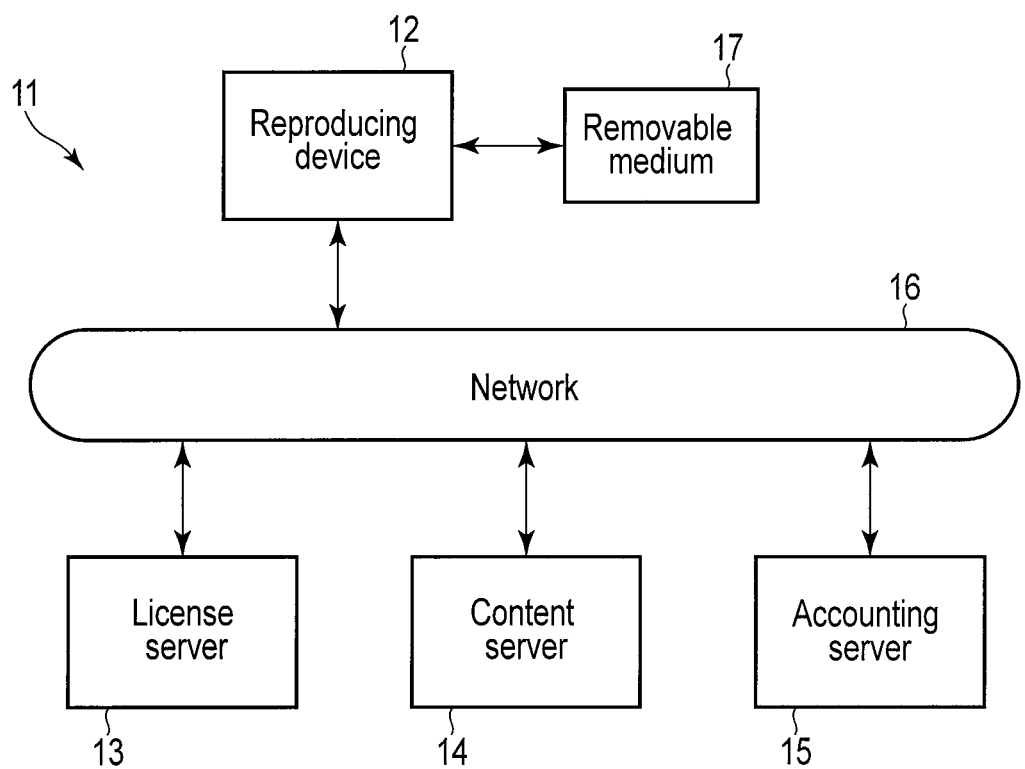
F I G. 1

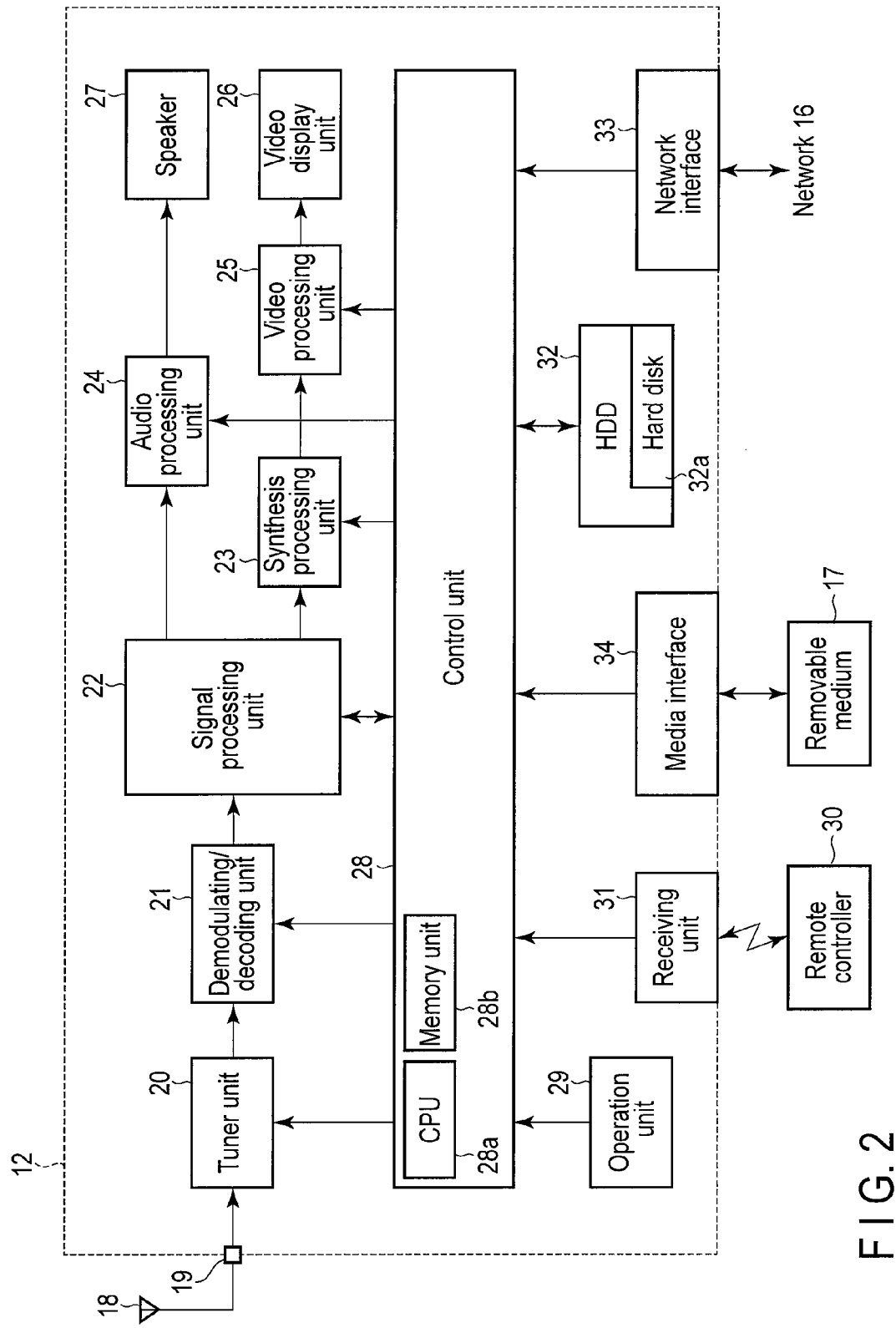
F I G. 2

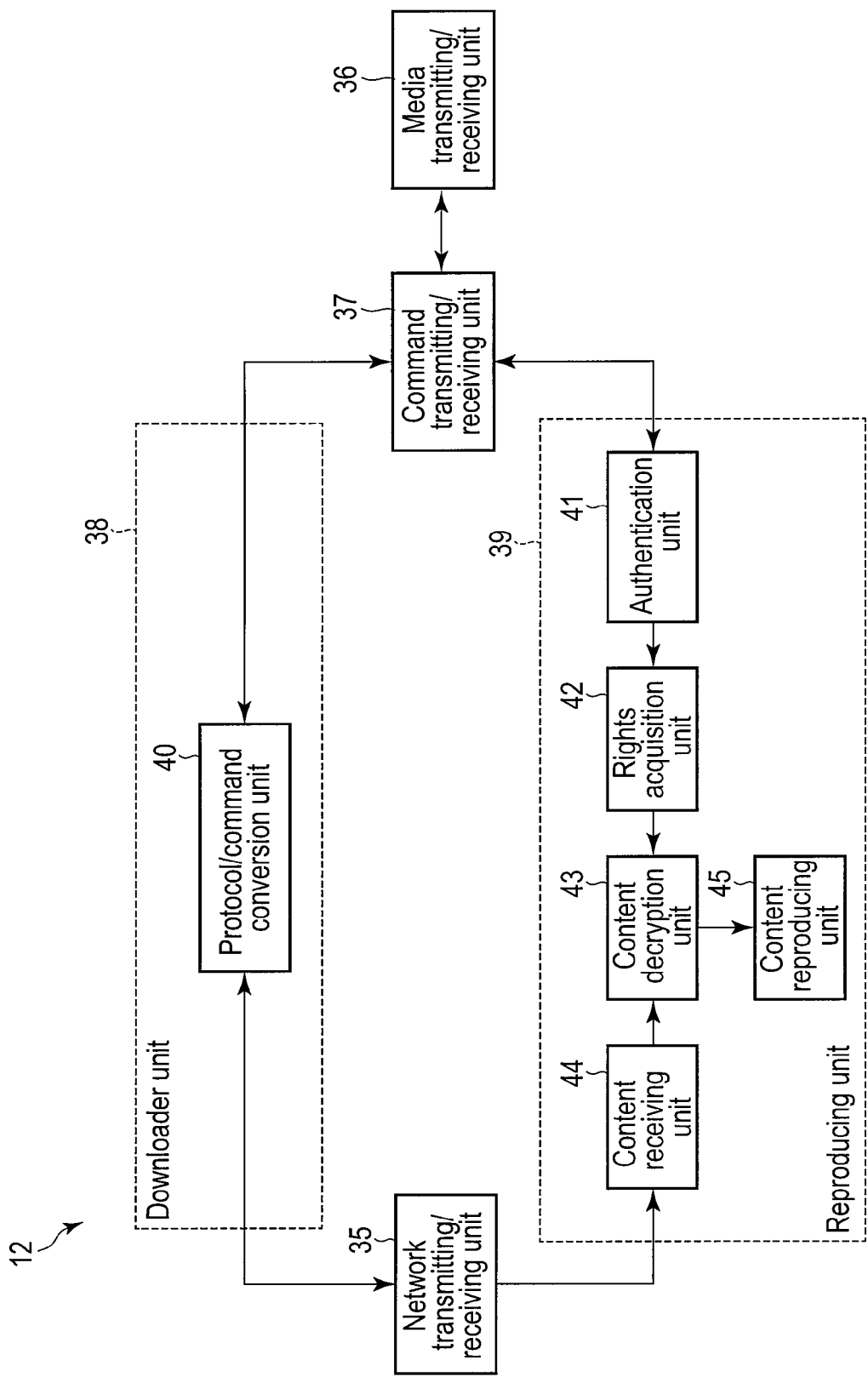
F I G. 3

CONTENT REPRODUCING DEVICE, CONTENT REPRODUCING METHOD, AND CONTENT REPRODUCING SYSTEM

CROSS REFERENCE TO RELATED APPLICATIONS

This application is a Continuation Application of PCT Application No. PCT/JP2013/063186, filed May 10, 2013, the entire contents of which are incorporated herein by reference.

FIELD

Embodiments described herein relate generally to a content reproducing device, content reproducing method, and content reproducing system each configured to subject content items to streaming reproduction.

BACKGROUND

As is well known, in a system in which a rights server configured to deliver rights information associated with content items, and removable medium provided with a copyright protection function for recorded content items can directly carry out mutual authentication through a reproducing device capable of carrying out recording/reproduction for the removable medium, rights information and encrypted content items are directly downloaded from the rights server to the removable medium, thereafter the reproducing device carries out mutual authentication between itself and the removable medium to thereby acquire rights information, and the reproducing device decrypts an encrypted content item while reading an encrypted content item from the removable medium, thereby reproducing the content items.

It should be noted that, in the system described above, it is necessary to download encrypted content items to the removable medium. In this case, if the content items are to be preserved as archives, it is rational to download the encrypted content items to the removable medium to record the content items thereon. However, recording content items on a removable medium in order to watch the content items only once or twice, and deleting the content items after watching leads to deterioration of flash memory elements constituting the removable medium, and makes no sense.

As shown in Document "Introducing Next-generation Secure Memory Technology" http://nextgenerationsecurememory.com/index.php/download_file/view/3/1/, in a next-generation secure memory (NSM) medium, the NSM medium carries out mutual authentication directly between itself and the server by an electronic sell-through (EST) use case to thereby download and record rights information (including a title key) and encrypted content items. Thereafter, a reproducing device configured to carry out recording/reproduction of the NSM medium carries out mutual authentication between itself and the NSM medium by using confidential information owned by itself, and acquires a title key to thereby decrypt and reproduce the encrypted content items stored in the NSM medium. However, the encrypted content items are recorded on the NSM medium, and hence flash memory elements constituting the NSM medium are deteriorated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram shown to roughly explain an example of a content reproducing system as an embodiment.

FIG. 2 is a block diagram shown to explain an example of a signal processing system of a case where a reproducing device constituting the content reproducing system of the embodiment is a digital television broadcast receiver.

FIG. 3 is a block diagram shown to explain an example of functional blocks each configured to carry out a characteristic processing operation of the reproducing device constituting the content reproducing system of the embodiment.

DETAILED DESCRIPTION

Figure 4:
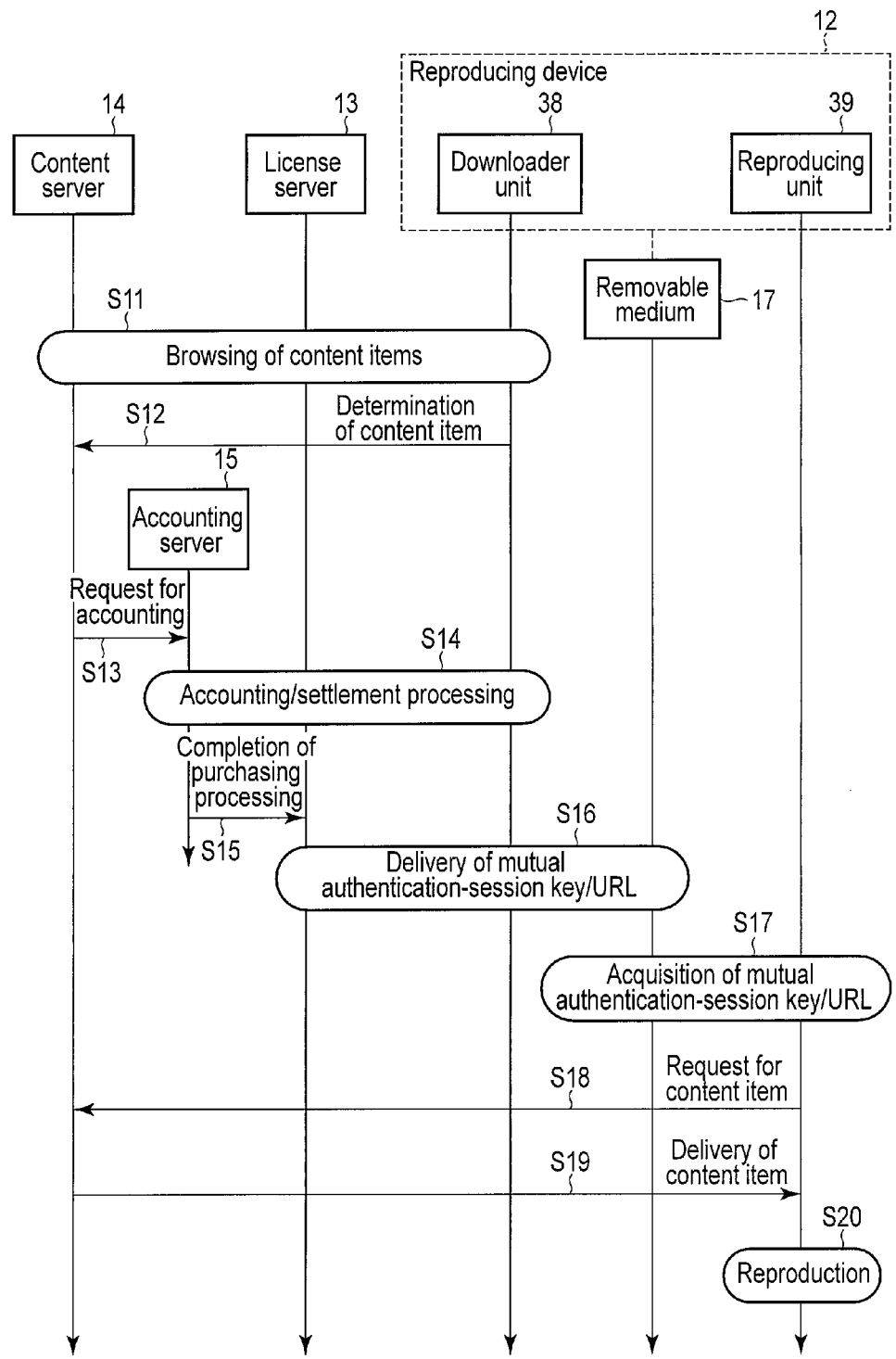
FIG. 4 is a view shown to explain an example of streaming reproduction sequence to be carried out by the content reproducing system of the embodiment.

Various embodiments will be described hereinafter with reference to the accompanying drawings.

In general, one embodiment is to provide a content reproducing device, content reproducing method, and content reproducing system capable of carrying out streaming reproduction by decrypting an encrypted content item while acquiring an encrypted content item from a content server without carrying out recording of an encrypted content item on a removable medium, and sufficiently protecting the encrypted content items and their rights information items.

According to the embodiment, a content reproducing device is provided with connection controller, and reproducing controller. The connection controller connects a license server configured to deliver rights information, and removable medium provided with a content protection function to each other in such a manner that mutual authentication can be carried out between the license server and removable medium, and that the rights information can be downloaded from the license server to the removable medium. The reproducing controller carries out mutual authentication between itself and the removable medium and, when authentication is successful, acquires rights information recorded on the removable medium to thereby decrypt the encrypted content items delivered by the content server, and subject the decrypted content items to streaming reproduction on the basis of the acquired rights information.

It is possible to provide a content reproducing device, content reproducing method, and content reproducing system capable of carrying out streaming reproduction by decrypting an encrypted content item while acquiring an encrypted content item from a content server without carrying out recording of an encrypted content item on a removable medium, and sufficiently protecting the encrypted content items and their right information items.

An embodiment will further be described with reference to the drawings.

FIG. 1 roughly shows an example of a content reproducing system 11 to be described in this embodiment. This content reproducing system 11 is constituted of a reproducing device 12, license server 13, content server 14, accounting server 15, and the like in a state where these constituent elements are connected to a network 16 such as the Internet or the like.

Among these elements, as the reproducing device 12, a digital television broadcast receiver incorporating therein, for example, a video output screen, speaker, and the like, set-top box (STB), and the like connectable to an external video display, speaker, and the like are assumed. Further, this reproducing device 12 can selectively communicate with the license server 13, content server 14, and accounting server 15 through the network 16. Further, for example, a removable medium 17 such as a Secure Digital (SD) memory card, and the like can be connected to this reproducing device 12. As the connection form, various forms such as a slot type, tray type, wired type, wireless type, and the like are conceivable.

The role of the license server 13 described above is to provide rights information, and the like constituted of a cryptographic key used to decrypt an encrypted content item, and usage rule, and the like describing a licensing condition of content items to the reproducing device 12. Further, the role of the content server 14 described above is to provide encrypted content items to the reproducing device 12. Furthermore, the role of the accounting server 15 is to carry out accounting processing happening to the user when watching of a chargeable content item is required. It should be noted that although the license server 13, content server 14, and accounting server 15 have been regarded as separate servers, they may be one and the same server.

FIG. 2 roughly shows an example of a signal processing system of the reproducing device 12. In FIG. 2, a case where the reproducing device 12 is a digital television broadcast receiver is assumed. That is, a digital television broadcast signal received by an antenna 18 is supplied to a tuner unit 20 through an input terminal 19, whereby a broadcast signal of a desired channel is selected.

The broadcast signal selected by the tuner unit 20 is supplied to a demodulating/decoding unit 21 to be restored to a digital video signal, audio signal, and the like and, thereafter the restored digital signals are output to a signal processing unit 22. This signal processing unit 22 subjects each of the digital video signal and audio signal supplied thereto from the demodulating/decoding unit 21 to predetermined digital signal processing.

Further, the signal processing unit 22 outputs the digital video signal to a synthesis processing unit 23, and outputs the digital audio signal to an audio processing unit 24. Of the two units, the synthesis processing unit 23 superimposes an on-screen display (OSD) signal on the digital video signal supplied from the signal processing unit 22, and outputs the resultant signal.

The digital video signal output from the synthesis processing unit 23 is supplied to a video processing unit 25, and is subjected therein to conversion processing for converting the video signal into an analog video signal of a format displayable by a video display unit 26 in the subsequent stage. Further, the analog video signal output from the video processing unit 25 is supplied to the video display unit 26, and is submitted for video display therein.

Further, the audio processing unit 24 converts the digital audio signal input thereto into an analog audio signal of a format reproducible by a speaker 27 in the subsequent stage. Then, the analog audio signal output from the audio processing unit 24 is supplied to the speaker 27, whereby the analog audio signal is submitted for audio reproduction.

Here, in the reproducing device 12, various operations including the above-mentioned various receiving operations are controlled by a control unit 28 in a centralizing manner. The control unit 28 incorporates therein a central processing unit (CPU) 28a, and controls each unit, by receiving operation information from an operation unit 29 provided on the main body of the reproducing device 12 or operation information transmitted from a remote controller 30, and received by a receiving unit 31, in such a manner that the operation contents are reflected.

In this case, the control unit 28 utilizes a memory unit 28b. The memory unit 28b includes a read-only memory (ROM) mainly storing therein a control program to be executed by the CPU 28a, random access memory (RAM) used to provide a work area for the CPU 28a, and nonvolatile memory storing therein various setting information items, control information, and the like.

Further, a hard disk drive (HDD) 32 is connected to the control unit 28. The control unit 28 can carry out control in such a manner that the digital video signal and audio signal obtained from the signal processing unit 22 are supplied to the HDD 32 on the basis of an operation of the operation unit 29 or the remote controller 30 carried out by the user, and each of the signals is encrypted, is converted into a predetermined recording format, and is thereafter recorded on a hard disk 32a.

Furthermore, the control unit 28 can carry out control in such a manner that the HDD 32 is caused to read a digital video signal, and audio signal from the hard disk 32a, and decode the read signals on the basis of an operation of the operation unit 29 or the remote controller 30 carried out by the user, and thereafter the decoded signals are supplied to the signal processing unit 22, whereby the decoded video signal, and audio signal are hereafter submitted for video display, and audio reproduction, respectively.

Further, a network interface 33 is connected to the control unit 28. This network interface 33 is connected to the network 16 described above. Accordingly, the control unit 28 can access the license server 13, content server 14, and accounting server 15, and carry out information communication with these servers through the network interface 33 and network 16 on the basis of an operation of the operation unit 29 or the remote controller 30 carried out by the user.

Furthermore, a media interface 34 is connected to the control unit 28. The removable medium 17 is connectable to the media interface 34. Accordingly, the control unit 28 can carry out information communication with the removable medium 17 through the media interface 34 on the basis of an operation of the operation unit 29 or the remote controller 30 carried out by the user.

FIG. 3 shows an example of a signal processing system of the reproducing device 12 as functional blocks each configured to carry out a characteristic processing operation to be described in this embodiment. That is, as described above, the reproducing device 12 is provided with a network transmitting/receiving unit (corresponding to the aforementioned network interface 33) 35 configured to connect the device 12 to the network 16. Further, the reproducing device 12 is provided with a media transmitting/receiving unit (corresponding to the aforementioned media interface 34) 36 configured to connect the device 12 to the removable medium 17.

Here, as the removable medium 17, for example, an SD memory card or the like is assumed. When data is to be transmitted to the removable medium 17, the reproducing device 12 creates a data packet or the like of command data by using a command transmitting/receiving unit 37, and transmits the created data packet or the like to the removable medium 17 through the media transmitting/receiving unit 36. Further, when data is to be received from the removable medium 17, the reproducing device 12 carries out interpretation of a data packet of a response and data received through the media transmitting/receiving unit 36.

The reproducing device 12 can roughly be divided into a downloader unit 38, and reproducing unit 39. The downloader unit 38 is basically a part configured to carry out protocol/command conversion utilized to correlate a protocol on the network 16 side, and a command to be transmitted/received to/from the removable medium 17 with each other at the time of communication of authentication or the like between the license server 13 or the content server 14 and removable medium 17.

In the downloader unit 38, a protocol/command conversion unit 40 carries out the protocol/command conversion. That is, although the payloads of packets used in communication of authentication or the like are identical to each other on both sides, packet formats holding the payloads for transmission/reception are different from each other, and hence protocol/command conversion is required, and the data items themselves to be transmitted/received are identical to each other.

In the reproducing unit 39, processing for reproducing a content item is carried out. When content reproduction processing is started, first an authentication unit 41 carries out authentication processing together with the removable medium 17 through the command transmitting/receiving unit 37. Here, each of the authentication unit 41, and removable medium 17 retains a certificate in which public key cryptography is used, and carries out mutual authentication.

After success in the mutual authentication is achieved, the authentication unit 41, and removable medium 17 derive a session key in the same creation algorithm. Each of the authentication unit 41, and removable medium 17 possesses the session key as a secret, and utilizes the session key as an encryption key for carrying out encryption when secret data communication is carried out between the authentication unit 41, and removable medium 17. The session key is, for example, 128-bit key data, and the cryptography can utilize the AES.

The authentication unit 41 can read/write data from/to a secret area of the removable medium 17. When data in the secret area of the removable medium 17 is to be read, the authentication unit 41 issues a command to read data from the secret area of the removable medium 17. Then, the data is read from the secret area in the removable medium 17, and the read data is encrypted by using the aforementioned session key. The encrypted data is read through the media transmitting/receiving unit 36, and is decrypted in the authentication unit 41 by using the session key retained by the authentication unit 41.

Further, when data is to be written to the secret area of the removable medium 17, processing opposite to the above is carried out. That is, the data is encrypted in the authentication unit 41 by using the session key and, when a command to write the data to the secret area of the removable medium 17 is issued from the authentication unit 41 through the command transmitting/receiving unit 37, the data is transmitted to the removable medium 17 through the media transmitting/receiving unit 36. In the removable medium 17, the encrypted data is decrypted by using the session key retained therein, and the decrypted data is written to the secret area of the removable medium 17.

A rights acquisition unit 42 is a part configured to interpret the data read from the removable medium 17, and acquire and interpret rights information constituted of a title key used to decrypt an encrypted content item, and usage rule, and the like describing a licensing condition of content items. In the usage rule, a licensing condition, and the like of content items is described, and the rights acquisition unit 42 determines whether or not the content items are used within the scope of the licensing condition with respect to the number of times of reproduction, permitted number of times of copying, permitted term of reproduction, and the like. When it is determined that the content items are used within the scope of use, the title key is extracted, and is transmitted to a content decryption unit 43.

Further, in the reproducing unit 39, content items are received from the content server 14 by a content receiving unit 44. In the rights information described above, a URL indicating an address of a content item is described in association with the address of the content server 14. The content receiving unit 44 accesses the content server 14 on the basis of the URL and obtains an encrypted content item.

As a transfer protocol of encrypted content items between the content server 14 and reproducing device 12, HTTP or Real-time Transport Protocol (RTP) is used. The content receiving unit 44 can receive an encrypted content item at a speed corresponding to the reproduction speed of a content item in the reproducing unit 39. Further, it is possible to receive only a necessary part of the entire content item in association with trick reproduction such as fast playback, chapter jump, and the like.

The encrypted content item received by the content receiving unit 44 is sent to the content decryption unit 43. Here, the encrypted content item is decrypted by using the aforementioned title key. Here, the content item is encrypted in, for example, a counter-mode of the AES. A content item encrypted in accordance with a predetermined format is decrypted. The decrypted content item is reproduced by a content reproducing unit 45.

FIG. 4 shows an example of streaming reproduction sequence utilizing the removable medium 17. The constituent elements are the four elements of the content server 14, accounting server 15, license server 13, and reproducing device 12 which have been described in connection with FIG. 1 and, furthermore, the reproducing device 12 is divided into the downloader unit 38, and reproducing unit 39 in terms of processing. Further, the removable medium 17 is connected to the reproducing device 12.

First, in step S11, the downloader unit 38 of the reproducing device 12 communicates with the content server 14, and selects a content item to be watched thereafter. The content server 14 presents a list of deliverable content items to the downloader unit 38.

Further, in step S12, the downloader unit 38 informs the content server 14 of the content item which the user has selected from the list, and has determined to watch.

Then, in step S13, the content server 14 carries out accounting processing about the content item required by the user. That is, the content server 14 requests the accounting server 15 to carry out accounting of the required content item.

Thereafter, in step S14, when accounting and settlement processing for the user is completed without any problem between the accounting server 15 and downloader unit 38, then, in step S15, the accounting server 15 provides a notification of completion of purchasing processing to the license server 13.

Here, in step S16, in the license server 13, rights information is created for the removable medium 17 connected to the reproducing device 12. When a content item is encrypted in advance in the content server 14, key data used to decrypt the encrypted content item is transferred from the content server 14 to the license server 13. In the license server 13, data is created as rights information by combining the key data, and a usage rule describing a licensing condition of a content item purchased by the user with each other.

Thereafter, the license server 13 indirectly communicates with the removable medium 17 through the downloader unit

38 of the reproducing device 12. Although the license server 13 communicates directly with the downloader unit 38 of the reproducing device 12, the downloader unit 38 converts the protocol into a command of the removable medium 17, whereby the license server 13 communicates indirectly with the removable medium 17.

At the time of communication, the license server 13, and removable medium 17 carry out mutual authentication. Although in the description of FIG. 3, the procedure for mutual authentication to be carried between the reproducing device 12 and removable medium 17 has been described, by replacing the reproducing device 12 with the license server 13, mutual authentication equivalent to the aforementioned mutual authentication is enabled.

That is, the license server 13 can read/write data from/to the secret area of the removable medium 17. In the license server 13, too, a certificate similar to that of the reproducing device 12, and of the other public key system is retained, and the license server 13 is configured to be able to carry out mutual authentication between itself and the removable medium 17.

At the stage at which the accounting processing has been completed, the downloader unit 38 of the reproducing device 12 starts a procedure for mutual authentication to be carried out by the license server 13, and removable medium 17. When the downloader unit 38 notifies the license server 13 of a start of mutual authentication, data about a start of authentication is sent thereto from the license server 13 as a response to the notification. The downloader unit 38 converts the data into a command, and transmits the command to the removable medium 17.

The removable medium 17 sends response data to the downloader unit 38 in response to the transmission. The downloader unit 38 converts the response data into a network protocol, and transmits the protocol to the license server 13.

The downloader unit 38 repetitively carries out such a procedure while carrying out mediation, whereby it becomes possible for the license server 13, and removable medium 17 to carry out mutual authentication. When the mutual authentication is successful, a session key jointly owned by only the license server 13 and removable medium 17 is created.

The aforementioned rights information is encrypted in the license server 13 by using the session key described above, and is transmitted to the removable medium 17 through the downloader unit 38. Having received the encrypted rights information, the removable medium 17 decrypts the rights information therein by using the session key, and writes the decrypted rights information to the secret area of its own.

Next, in step S17, the reproducing unit 39 of the reproducing device 12, and removable medium 17 carry out mutual authentication. The procedure for the mutual authentication is as shown in the description of FIG. 3. When a success in the mutual authentication between (the authentication unit 41 of) the reproducing unit 39, and removable medium 17 is achieved, another session key different from the aforementioned session key is jointly owned by the two. The reproducing unit 39 acquires the rights information from the removable medium 17 by using the session key.

Thereafter, in the reproducing unit 39, a content item is received from the content server 14 by the content receiving unit 44. That is, as described previously, a URL indicating an address of a content item is described in the rights information in association with the address of the content server 14, and hence in step S18, the content receiving unit 44 accesses the content server 14 on the basis of the URL and obtains an encrypted content item in step S19.

The encrypted content item received by the content receiving unit 44 is sent to the content decryption unit 43, and is decrypted by using the aforementioned title key. Thereafter, in step S20, the decrypted content item is reproduced in the content reproducing unit 45.

Figure 5:
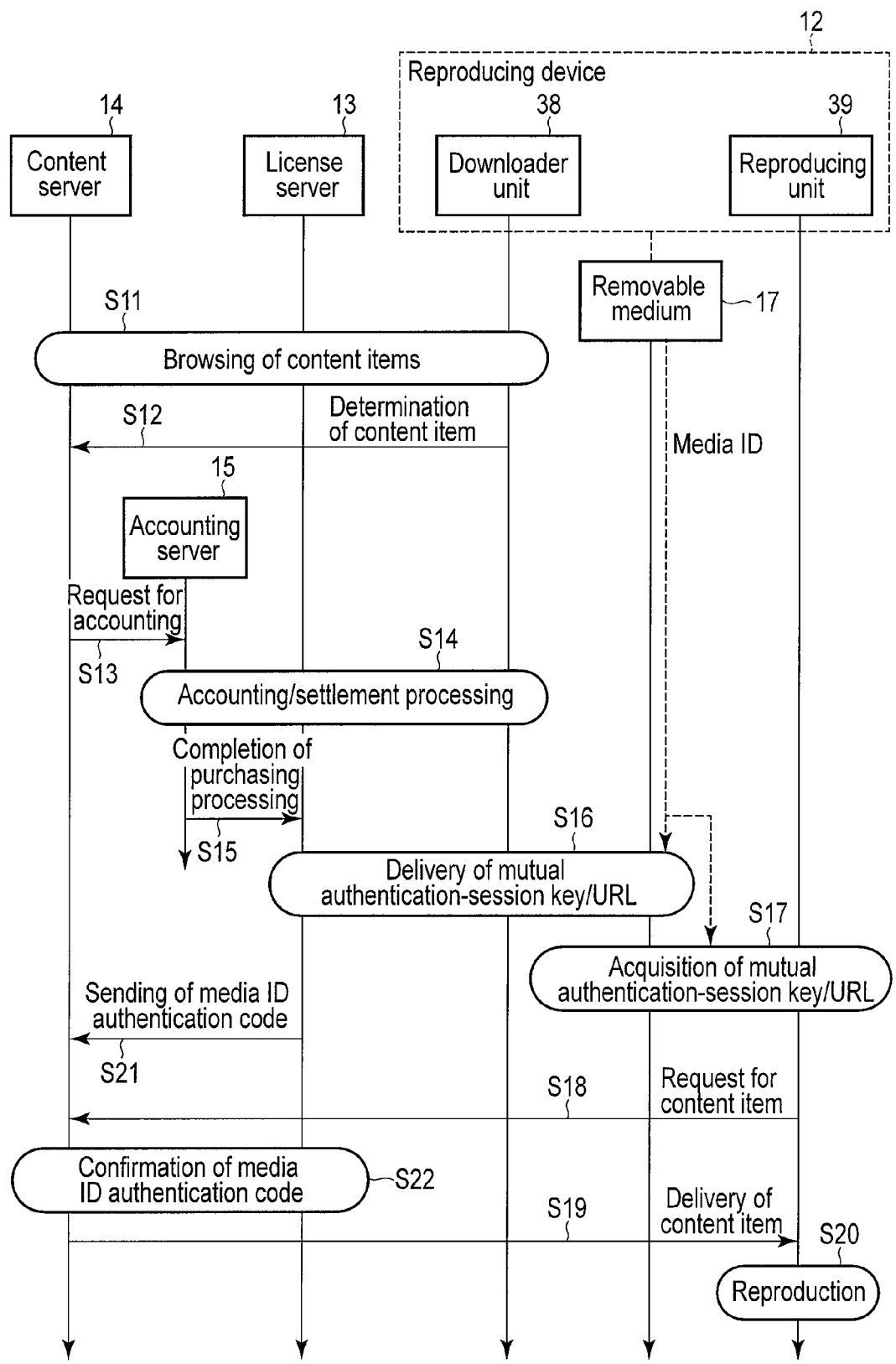
FIG. 5 is a view shown to explain another example of streaming reproduction sequence to be carried out by the content reproducing system of the embodiment.

FIG. 5 shows another example of the streaming reproduction sequence described in connection with FIG. 4. In FIG. 5, giving a description by denoting steps identical to FIG. 4 by identical reference symbols, in the removable medium 17, a media ID which is an identifier unique to each medium is written to the secret area thereof.

Thus, in the procedure for the mutual authentication carried out between the license server 13 and removable medium 17 in step S16, the license server 13 acquires a media ID from the removable medium 17. Further, the license server 13 creates a media ID authentication code (rights information delivered) which is a message authentication code (MAC) associated with the media ID by using the title key as a key, and writes the media ID authentication code to the removable medium 17.

Further, at the time of reproduction, when the title key is acquired from the removable medium 17 in step S17, the reproducing unit 39 acquires the media ID from the removable medium 17 in the procedure for the mutual authentication carried out between itself and the removable medium 17 in the same manner as the license server 13. Further, the reproducing unit 39 creates, by using a title key which can be acquired after a success in mutual authentication, and the acquired media ID, a media ID authentication code which is a message authentication code (MAC) associated with the media ID by using the title key as a key in the same manner as the license server 13, and verifies whether or not the created media ID authentication code is identical to the media ID authentication code recorded on the removable medium 17. When the verification is successful, the reproducing unit 39 can decrypt an encrypted content item by using the title key.

That is, after the accounting processing of the content item is completed, and the rights information is written from the license server 13 to the removable medium 17, the media ID authentication code is sent from the license server 13 to the content server 14 as shown in step S21. Further, in step S18, when the reproducing unit 39 requests a content item from the content server 14, the reproducing unit 39 sends a media ID authentication code to the content server 14 at the same time.

Further, as shown in step S22, in order to confirm whether or not the requestor of the content item already retains rights information, the content server 14 confirms whether or not a media ID authentication code is registered in the content server 14. When the confirmation is obtained, the content server 14 gradually starts content streaming delivery. When the confirmation is not obtained, the content server 14 does not start content streaming delivery, and sends an error reply to the requestor. Thereby, it is possible for the content server 14 to confirm whether or not the requestor requests a content item after previously acquiring rights information. By suppressing a request when rights information is not acquired in the reproducing unit 39, it is possible to conserve the resource of the network 16.

Figure 6:
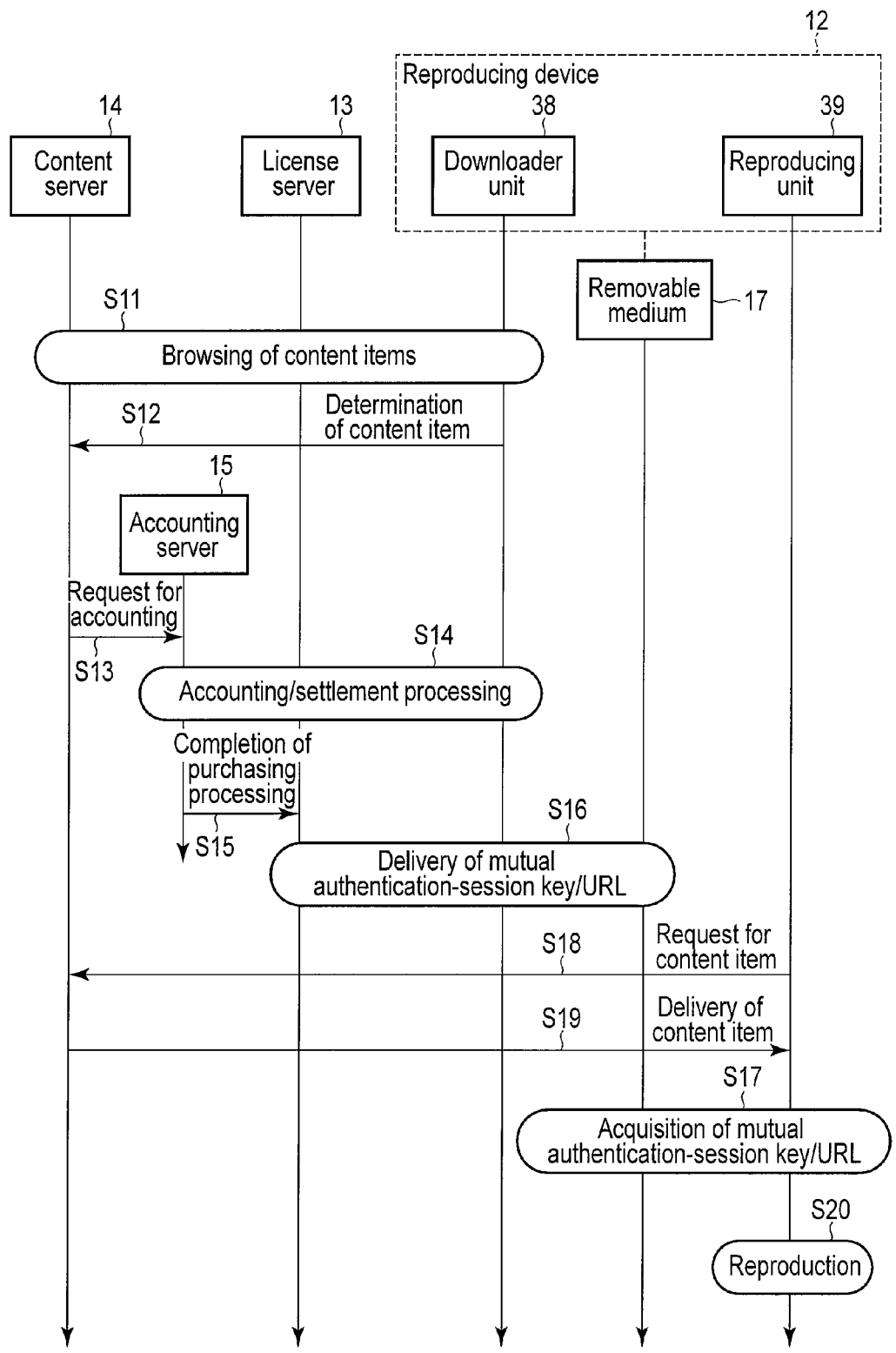
FIG. 6 is a view shown to explain still another example of streaming reproduction sequence to be carried out by the content reproducing system of the embodiment.

FIG. 6 shows still another example of the streaming reproduction sequence described in connection with FIG. 4. In FIG. 6, giving a description by denoting steps identical to FIG. 4 by identical reference symbols, the processing in which the reproducing unit 39 requests a content item from the content server 14 (step S18) is carried out prior to the processing in which the reproducing unit 39 acquires the rights information from the removable medium 17 (step S17).

That is, the encrypted content item is an enormous file, and hence about several minutes to about several tens of minutes is required until a sufficient amount of data enabling reproduction processing is accumulated. On the other hand, the time required to acquire the rights information from the removable medium 17 is about several seconds, and hence in order that reproduction can be started earlier even by a short time, first the processing of acquiring the content item is started, and the processing of acquiring the rights information is carried out concurrently with the processing started first, whereby it is possible to shorten the time required before the reproduction of the content item is started.

It should be noted that in the streaming reproduction sequence shown in FIG. 6, too, it is possible to additionally carry out the processing of confirming the media ID authentication code described in connection with FIG. 5.

Further, it is possible to store the accounting-settlement state of the content item, and media ID of the removable medium 17 as the delivery destination of the rights information in association with each other in the license server 13. Thereby, even when the removable medium 17 is initialized, and the rights information is deleted, the media ID of the removable medium 17 which provided rights information in the past is stored in the license server 13, and hence it is possible to recognize that a request from the removable medium 17 retaining the same media ID has been received at the time of mutual authentication without carrying out second accounting/settlement processing. Accordingly, it is possible to provide rights information to the removable medium 17 again.

Furthermore, it can also be considered as an idea to make it possible to register a plurality of media IDs in one account of an end user of the license server 13. Thereby, in the license server 13, when a request for rights information is received from a removable medium 17 retaining one of the plurality of registered media IDs, the removable medium 17 is regarded as having already been subject to downloading, and thus it is possible to provide rights information to the removable medium 17 again without carrying out second accounting/settlement processing.

According to the embodiment described above, rights information is recorded on the removable medium 17, and the reproducing device carries out streaming reproduction while decrypting the encrypted content items delivered from the content server 14, and hence it is possible to prevent an enormous amount of encrypted content items from being recorded on the removable medium 17. Accordingly, it is possible to reduce deterioration of recording elements of the removable medium 17 and, by extension it becomes possible to prevent the lifetime of the removable medium 17 from being shortened.

Further, after the license server 13 carries out mutual authentication directly between itself and the removable medium connected to the reproducing device 12, the rights information is downloaded to the removable medium 17 to be recorded thereon. Accordingly, the reproducing device 12 need not retain confidential information required to download rights information from the license server 13, and can download rights information from the license server 13 to the removable medium 17 by protection means of one system.

Furthermore, the reproducing device 12 is configured in such a manner that the device 12 can acquire rights information by carrying out mutual authentication between itself and the removable medium 17 without carrying out mutual authentication directly between itself and the license server 13. Accordingly, it becomes possible to preserve rights information in the removable medium 17 offline.

Further, the rights information may not be recorded on the removable medium 17, and the reproducing device 12 may acquire the rights information. More specifically, the license server 13, and removable medium 17 carry out mutual authentication and, thereafter the rights information is retained by the reproducing device 12. Thereafter, the reproducing device 12, and removable medium 17 carry out mutual authentication, and a key used to decrypt the retained rights information is obtained. The reproducing device 12 decrypts the rights information by using the key to thereby obtain an encrypted content item, and reproduce the content item. That is, here, not only the encrypted content item, but also the rights information is not recorded on the removable medium 17, and the removable medium 17 is configured to function as a physical medium used to carry out authentication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content reproducing device comprising:
a connection controller configured to connect a license server configured to deliver rights information, and a removable medium provided with a content protection function to each other in such a manner that mutual first authentication can be carried out between the license server and the removable medium, and that the rights information comprising an address and a title key of a content item can be downloaded from the license server to the removable medium; and
a reproducing controller configured to
carry out mutual second authentication between itself and the removable medium when the first authentication is successful,
acquire the rights information comprising the address and the title key from the removable medium when the second authentication is successful,
acquire an encrypted content item from a content server on the basis of the address in the acquired rights information, and
decrypt the encrypted content item on the basis of the title key in the acquired rights information, and subjecting the decrypted content item to streaming reproduction.

2. The content reproducing device of claim 1, wherein while carrying out first acquiring of the encrypted content item delivered by the content server, the reproducing controller carries out second acquiring of the rights information recorded on the removable medium by carrying out the mutual second authentication between the reproducing controller and the removable medium in parallel with the first acquiring.

3. The content reproducing device of claim 1, wherein when acquiring of the encrypted content item from the content server is carried out, the reproducing controller transmits a media ID authentication code to be derived from a media ID and the title key of the content item described in the removable medium to the content server.

4. The content reproducing device of claim 1, wherein the connection controller is provided with converter configured to correlate a protocol on the license server side with a command for the removable medium.

5. A content reproducing method comprising:
causing a license server configured to deliver rights information, and a removable medium connected to a content reproducing device, and provided with a content protection function to carry out mutual first authentication between the license server and the removable medium, and to download, when the mutual first authentication is successful, the rights information comprising an address and a title key of a content item from the license server to the removable medium to record the rights information on the removable medium; and causing the removable medium, and the content reproducing device to carry out mutual second authentication between the removable medium and the content reproducing device, acquiring, when the mutual second authentication is successful, the rights information recorded on the removable medium by the content reproducing device, acquiring an encrypted content item from a content server based on the address in indicated by the acquired rights information, and decrypting the encrypted content item based on the title key, and subjecting the decrypted content item to streaming reproduction.

6. A content reproducing system comprising:
a connection device for connecting a license server configured to deliver rights information, and a removable medium connected to a content reproducing device, and provided with a content protection function configured to carry out mutual first authentication between the license server and the removable medium, and when the mutual first authentication is successful, to download the rights information comprising an address and a title key of a content item from the license server to the removable medium, and to record the rights information on the removable medium; and a reproducing controller for causing the removable medium, and the content reproducing device to carry out mutual second authentication between the removable medium and the content reproducing device, causing, when the mutual second authentication is successful, the content reproducing device to acquire the rights information recorded on the removable medium, and causing the content reproducing device to decrypt an encrypted content item delivered from a content server based on an address in the acquired rights information, and subject the decrypted content item to streaming reproduction.

7. The content reproducing system of claim 6, wherein while the content reproducing device carries out acquiring of the encrypted content item delivered from the content server, the reproducing controller carries out processing of causing the removable medium, and the content reproducing device to carry out the mutual second authentication between the removable medium and the content reproducing device in parallel with the acquiring of the encrypted content item carried out by the content reproducing device.

8. The content reproducing system of claim 6, wherein the reproducing controller confirms that the acquired rights information is retained in the content reproducing device by causing the content server to confirm a media ID authentication code derived by the license server from a media ID and the title key of the content item described in the removable medium, and an acquired media ID authentication code derived by the content reproducing device from the media ID and the title key of the content item described in the removable medium when the content server delivers an encrypted content item to the content reproducing device.

9. The content reproducing system of claim 6, wherein the license server registers a media ID of the removable medium to which the rights information has been downloaded, and on which the downloaded rights information has been recorded.

10. The content reproducing system of claim 6, wherein the license server registers media IDs of a plurality of removable media as a group, and when a request for acquisition of first rights information which has formerly been delivered to one of the removable media belonging to the same group is made by a first removable medium belonging to the same group, the license server delivers the first rights information to the first removable medium which is the requestor without carrying out mutual authentication.

* * * * *